United States Patent [19]

Favor et al.

[11] Patent Number: 5,093,778
[45] Date of Patent: Mar. 3, 1992

[54] INTEGRATED SINGLE STRUCTURE BRANCH PREDICTION CACHE

[75] Inventors: John G. Favor, San Jose; David R. Stiles, Sunnyvale; Korbin Van Dyke, Fremont; Walstein B. Smith, III, San Jose, all of Calif.

[73] Assignee: Nexgen Microsystems, San Jose, Calif.

[21] Appl. No.: 485,307

[22] Filed: Feb. 26, 1990

[51] Int. Cl.[5] ............................................. G06F 12/08
[52] U.S. Cl. ................................ 395/375; 364/243.41; 364/253.1; 364/261.4; 364/DIG. 1
[58] Field of Search ... 364/200 MS File, 900 MS File

[56] References Cited

U.S. PATENT DOCUMENTS

| | | | |
|---|---|---|---|
| 4,442,488 | 4/1984 | Hall | 364/200 |
| 4,594,659 | 6/1986 | Guenthner et al. | 364/200 |
| 4,679,141 | 7/1987 | Pomerene et al. | 364/200 |
| 4,775,955 | 10/1988 | Liu | 364/900 |
| 4,777,594 | 10/1988 | Jones et al. | 364/200 |
| 4,796,175 | 1/1989 | Matsuo et al. | 364/200 |
| 4,847,753 | 7/1989 | Matsuo et al. | 364/200 |
| 4,860,199 | 8/1989 | Langendorf et al. | 364/200 |
| 4,882,673 | 11/1989 | Witt | 364/200 |
| 4,894,772 | 1/1990 | Langendorf | 364/200 |
| 4,926,323 | 5/1990 | Baror et al. | 364/200 |
| 4,943,908 | 7/1990 | Emma et al. | 364/200 |

OTHER PUBLICATIONS

David R. Stiles and Harold L. McFarland; "Pipeline Control for a Single Cycle VLSI Implementation of a Complex Instruction Set Computer"; *Computer Society of the IEEE;* pp. 504–508.

A. Thampy Thomas; "A Single Cycle VLSI CISC-Based Workstation: System Overview and Performance Characteristics"; *Computer Society of the IEEE;* pp. 500–503.

Atig Raza; "Technology Constraints on VLSI Processor Implementation"; *Computer Society of the Thirty-Fourth IEEE;* pp. 509–512.

*Primary Examiner*—Thomas M. Heckler
*Attorney, Agent, or Firm*—Townsend and Townsend

[57] ABSTRACT

The present invention provides an improved branch prediction cache (BPC) structure that combines various separate structures into one integrated structure. In conjunction with doing this, the present invention is able to share significant portions of hardware cost and design complexity overhead. As a result, the cost-performance trade-off for implementing dynamic branch prediction for target address, branch direction, and target instructions aspects of branches shifts to where "full" branch prediction is now more practical.

6 Claims, 8 Drawing Sheets

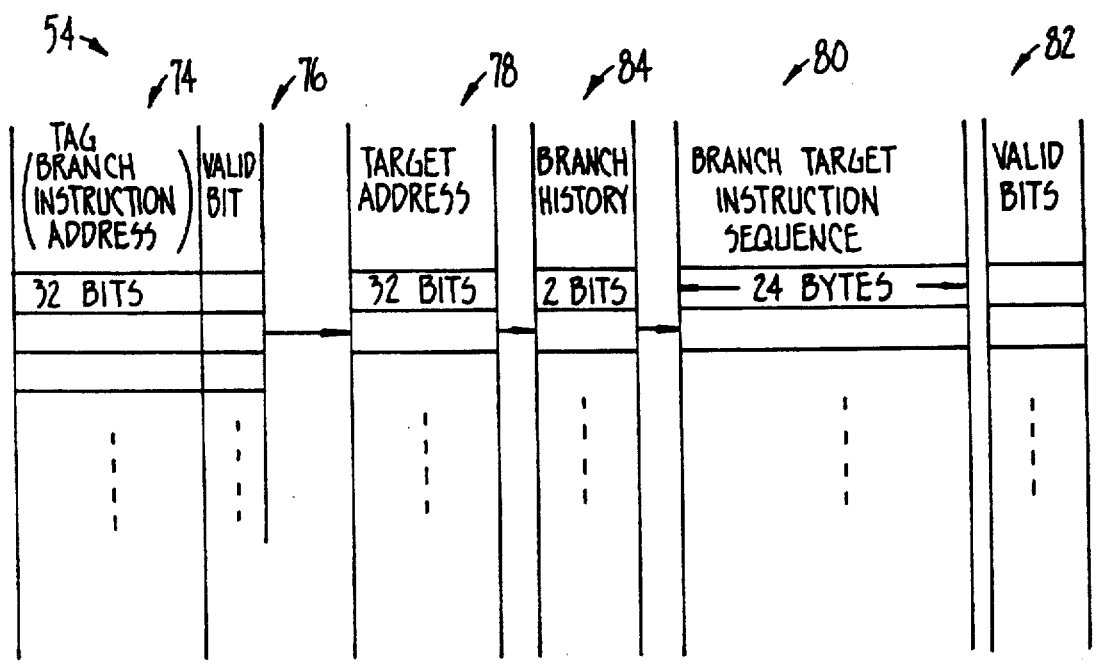
FIG._1.

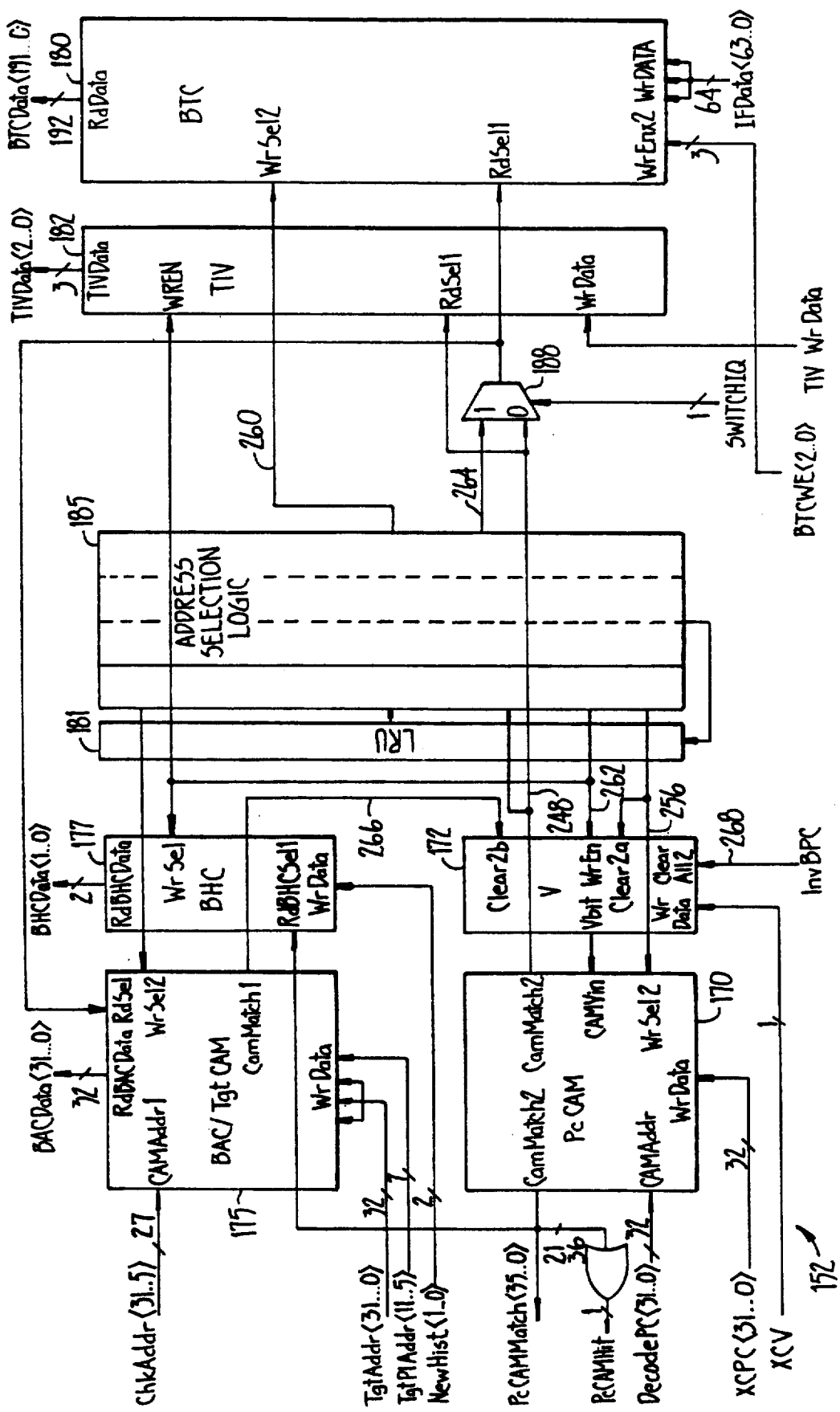
FIG._2.

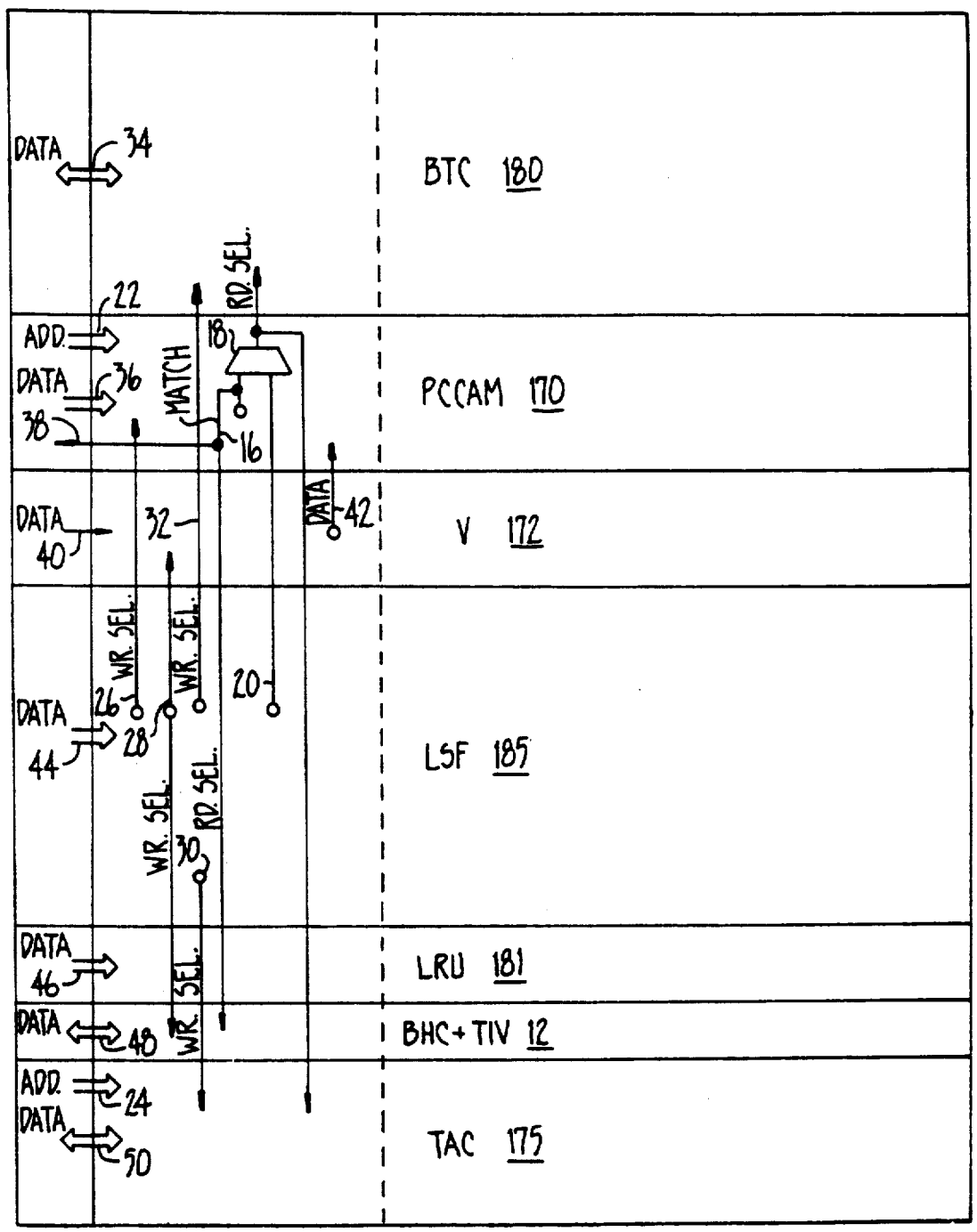
FIG._3.

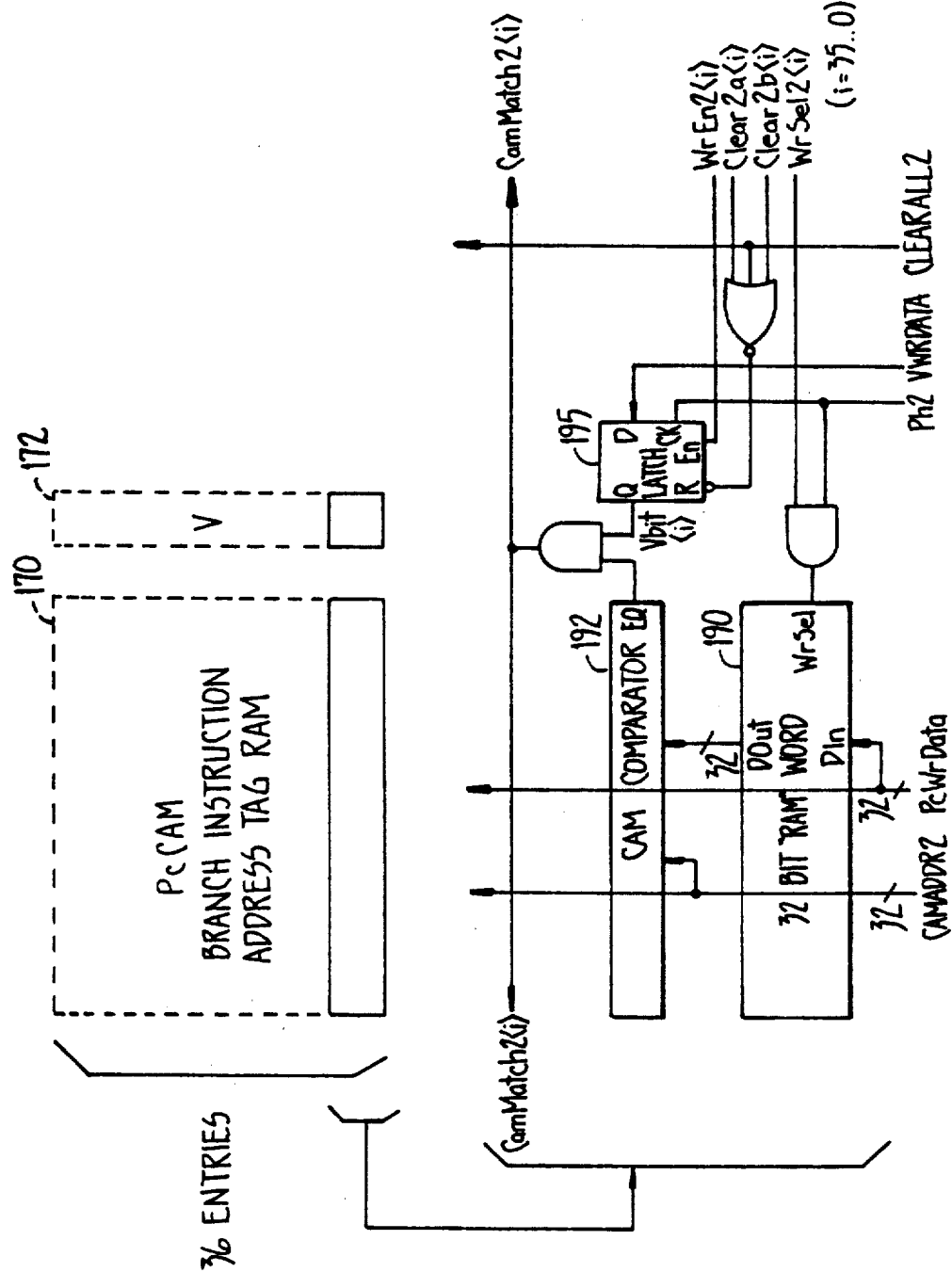
FIG._4.

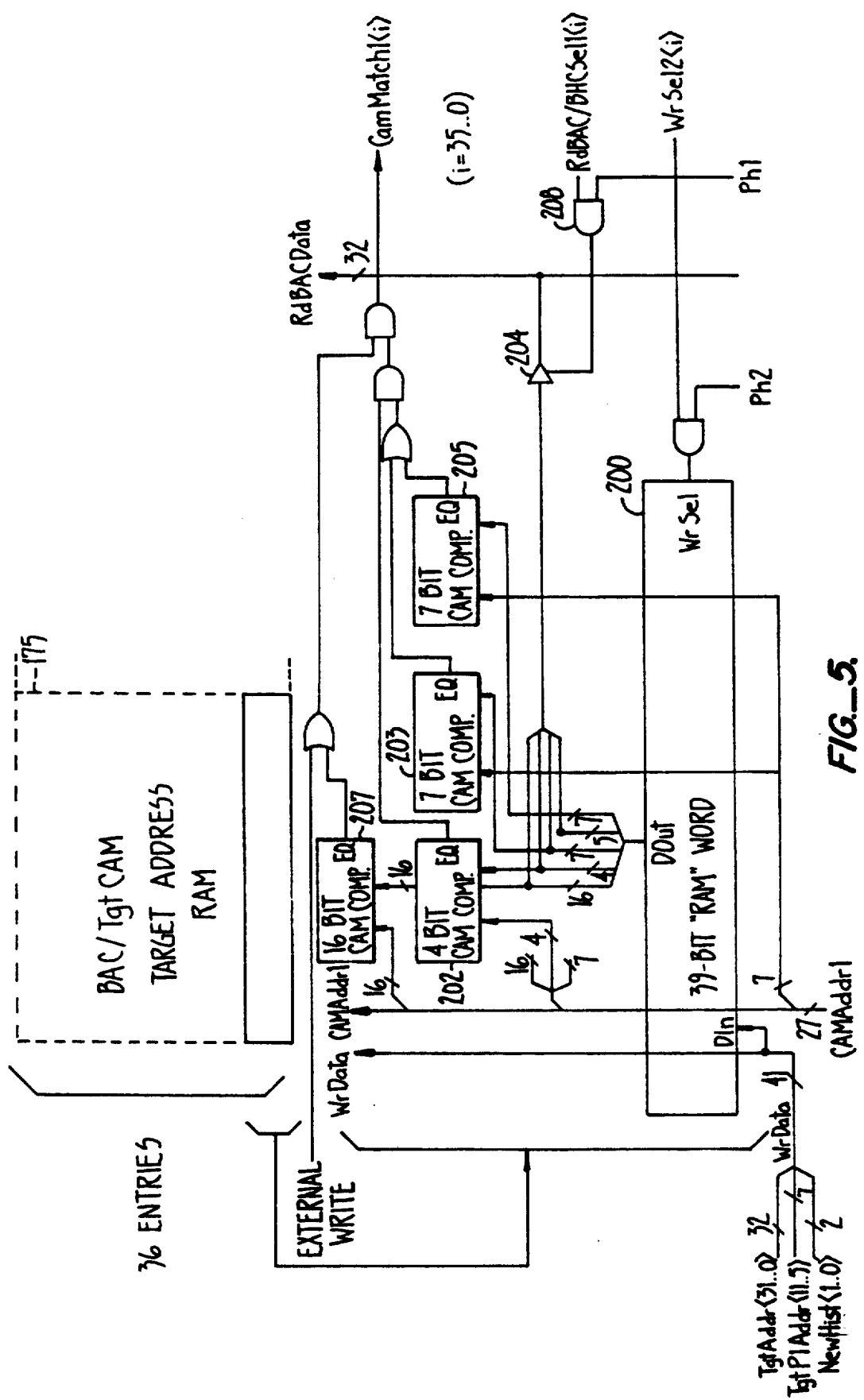
FIG._5.

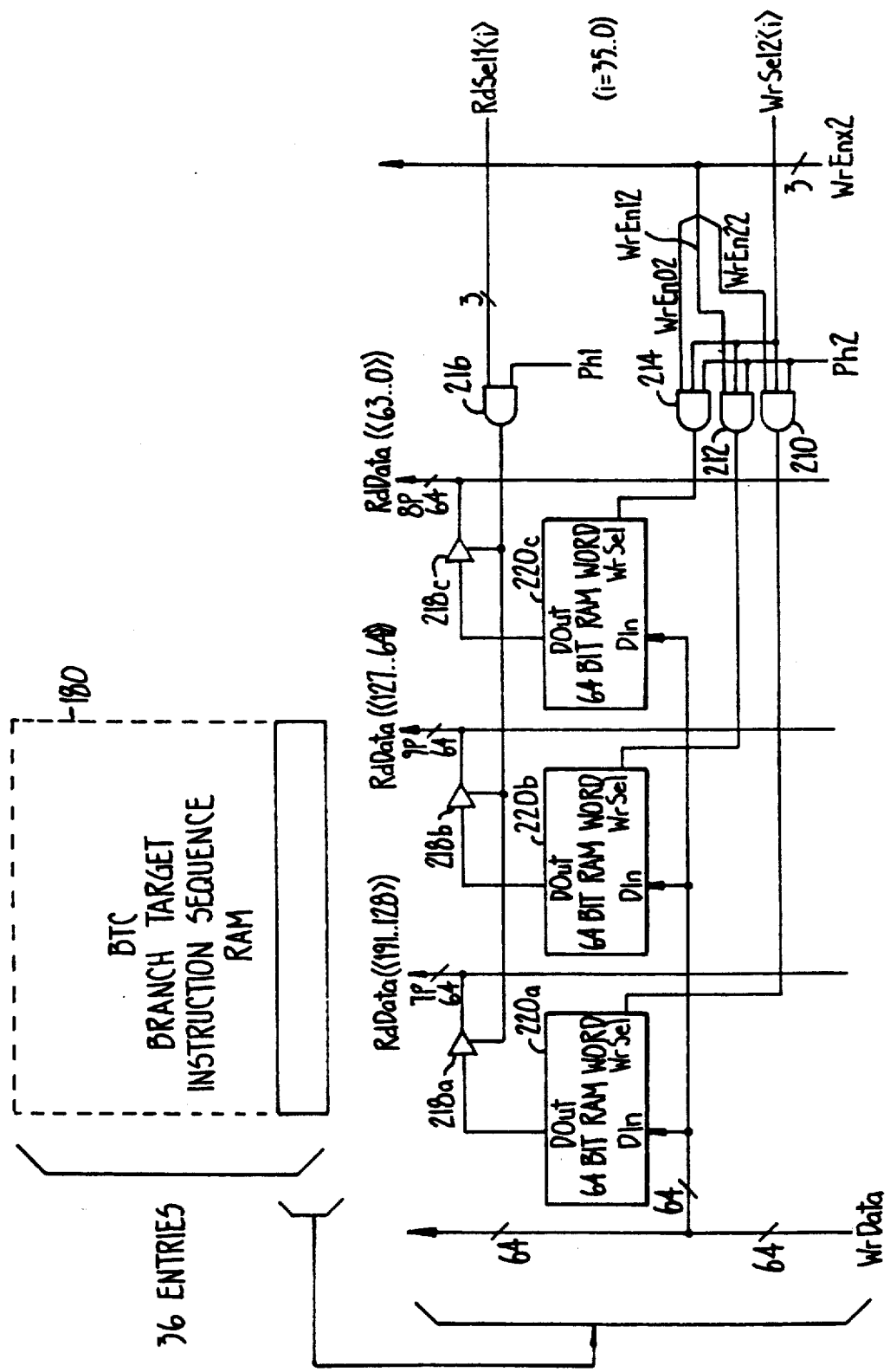
FIG._6.

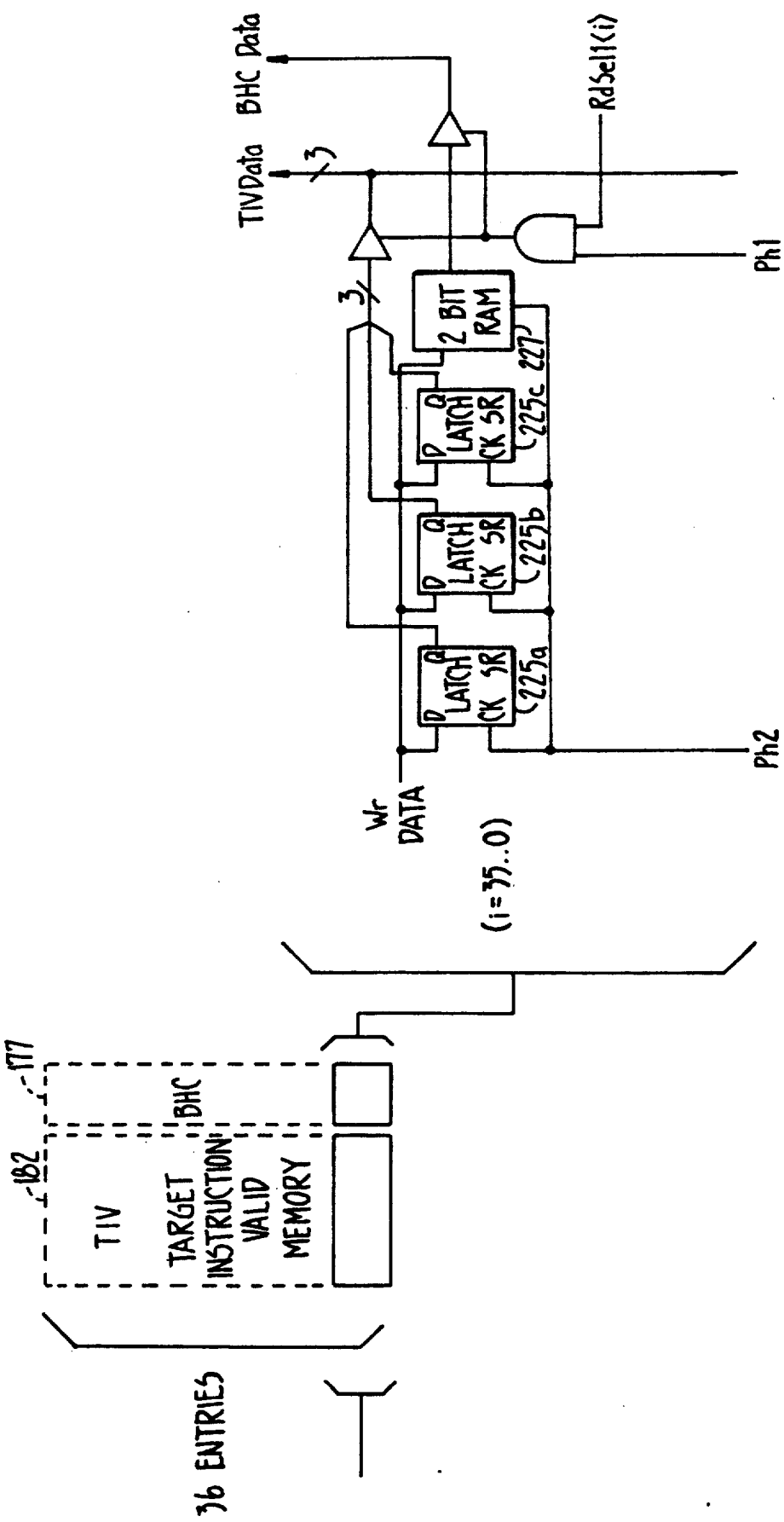
FIG._7.

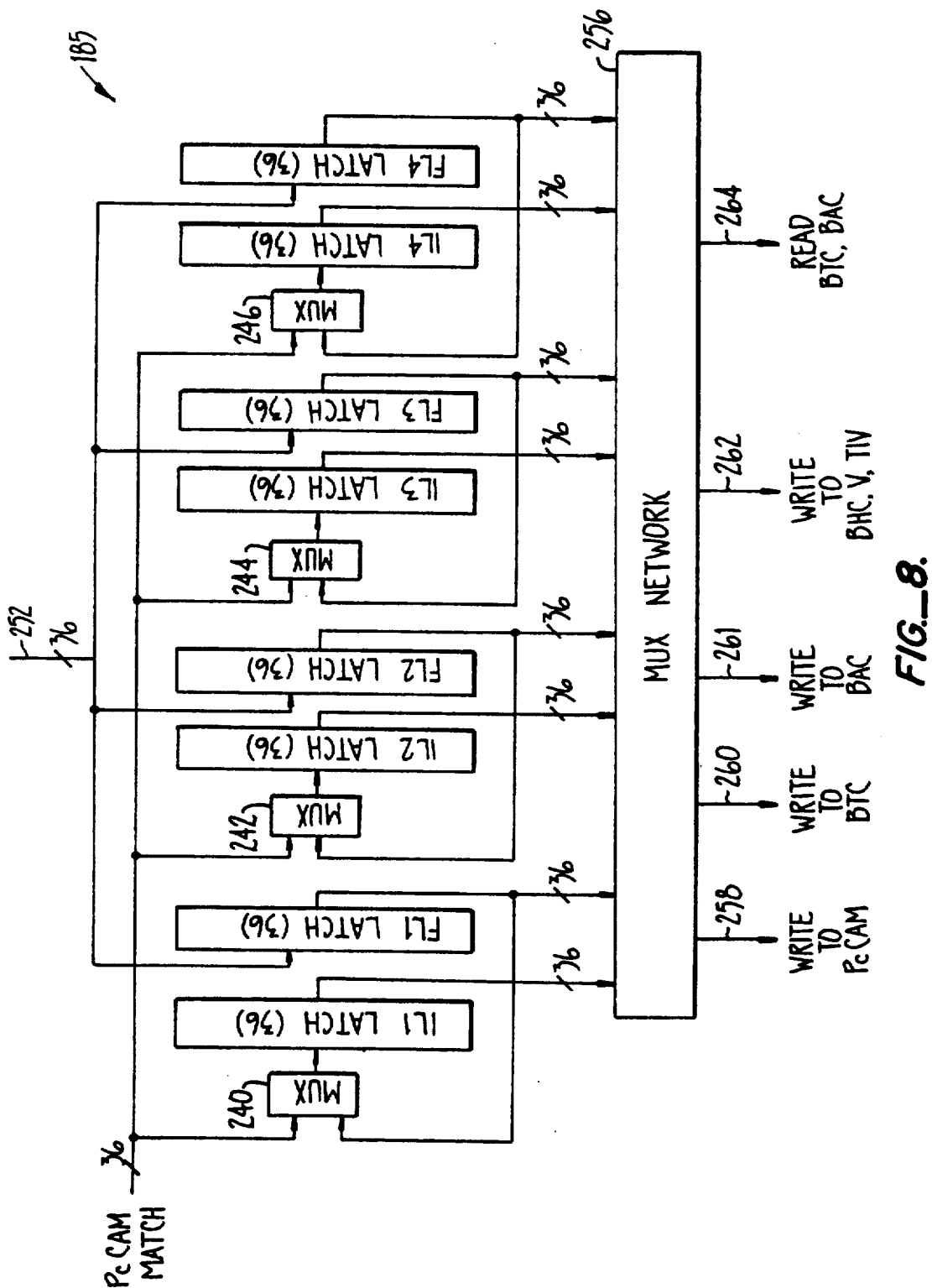
FIG._8.

INTEGRATED SINGLE STRUCTURE BRANCH PREDICTION CACHE

BACKGROUND OF THE INVENTION

As computer designers have designed increasingly higher performance implementations of various computer architectures, a number of classes of techniques have been developed to achieve these increases in performance. Broadly speaking, many of these techniques can be categorized as forms of pipelining, caching, and hardware parallelism. Some of these techniques are generally applicable to and effective in the implementation of most types of computer architectures, while others are most appropriate in the context of speeding up the implementations of complex instruction set computers (CISC's).

Due to the nature of typical CISC instruction sets, the processing of each instruction often requires a relatively long sequence of operations to be performed. Lower performance implementations consequently spend a large number of processor cycles performing these operations in a largely sequential, though possibly somewhat overlapped, manner. High performance implementations, on the other hand, often resort to using large degrees of hardware parallelism and pipelining to improve the processing throughput rate of the central processing unit (CPU).

In both case, the processing latency for each instruction is large; in the latter case, though, the goal is to achieve the appearances of each instruction requiring only one or a few processor/clock cycles to be processed. As long as the processing of successive instructions can be successfully pipelined and more generally overlapped, this goal is achieved. Typically, however, various types of dependencies between neighboring instructions result in processing delays.

A number of techniques are available to reduce or eliminate the impact of these dependencies. One area where this is critical is in the handling of control dependencies, i.e. branching type instructions. In the context of a CISC architecture implementation, the handling of such dependencies is difficult. CISC architecture requires the ability to quickly calculate or otherwise determine the target address of the branch, to quickly resolve the proper path of subsequent instruction processing in the case of conditional branches, and in all cases to then quickly restart the fetching of instructions at the new address. To the extent that these operations cannot be performed quickly, pipeline processing delays result.

Relatively long pipelines, or at least large processing latencies, typical in a high performance CISC implementation, makes these operations difficult to consistently speed up. These latencies, in conjunction with inter- and intra-instruction dependencies, result in inherent delays in the performance of these operations.

Various prediction and caching techniques can be applied to minimize the actual impact of these delays on processing throughput. These techniques attempt to consistently and accurately predict the information to be produced by the above operations. Such information may include branch target address, conditional branch direction, and the first one or more instructions at the branch target address. The percentage success rates of these prediction techniques then reduce the effective delay penalties incurred by the above three operations by corresponding amounts. In the extreme and ideal case of 100% success rates, these delays potentially can be eliminated.

There are various forms of "static" prediction techniques for predicting the direction of a conditional branch. These relatively simple techniques take advantage of the statistical bias that generally exists in the direction taken by different types of branches. Each time a given type of branch is encountered, a fixed prediction is made based on the expected statistic regarding the likelihood of that type of branch being taken.

More sophisticated and generally more successful techniques attempt to retain dynamic information accumulated during the execution of a program. By retaining or caching information from the prior processing of branch instructions, it is possible to make "more intelligent", or statistically more successful, future predictions. Further, by caching appropriate information, it is possible to make worthwhile predictions regarding not only branch directions, but also branch target addresses and target instructions.

When a branch instruction is encountered again, and information from previous processing of this instruction is still to be found in the prediction cache structure, this cached information is then used to make a dynamic prediction for the current occurrence of the branch. When no such information is to be found in the prediction cache structure, either a "blind" static prediction must be made, or normal processing, with the attendant possibility of incurring delays, must be performed.

Past high-performance CISC designs have attempted to perform dynamic prediction of only one or of a subset of the three types of information mentioned above. For each form of dynamic prediction, an appropriate structure is designed to cache the necessary information from past branches. For the handling of the other aspects of a branch, either static prediction or simply normal processing is utilized.

In an aggressive, all-encompassing design one could envision the caching of a wide range of information sufficient to enable relatively successful dynamic prediction of all three types of branch information. Past design approaches have, in essence, traded off the performance potential of this type of design for reductions in the hardware costs and design complexity of branch processing related circuitry.

Incremental improvements upon the branch processing capabilities of a modest design by the addition of dynamic prediction for each aspect of branch instructions can incur large hardware and design complexity costs. Not only are there inherent costs for storing the requisite information from past branches and utilizing it in the processing of future branches, but there are also significant overhead costs.

For each information caching structure there is significant peripheral circuitry necessary for accessing the structure in various ways (e.g. reading and/or writing in indexed and/or associative manners). There is also significant control circuitry for managing the accessing of each structure and the overall operation of these structures in conjunction with the processing of branch instructions. With the inclusion of each further form of branch prediction, the overhead hardware costs are additive and the design costs are at best additive and possibly multiplicative.

While these incremental overhead costs cannot be eliminated, to the extent that they can be reduced (i.e. to have less than additive hardware cost and design complexity impacts), one could shift such a cost-performance trade-off towards greater branch prediction capabilities and thus higher performance.

SUMMARY OF THE INVENTION

The present invention provides an improved branch prediction cache (BPC) structure that combines various separate structures into one integrated structure. In conjunction with doing this, the present invention is able to share significant portions of hardware cost and design complexity overhead. As a result, the cost-performance trade-off for implementing dynamic branch prediction for target address, branch direction, and target instructions aspects of branches shifts to where "full" branch prediction is now more practical.

This integrated structure has several intertwined components. Some of these components are various types of storage arrays, including a program counter content addressable memory (PcCAM) with associated valid bit (Vbit) memory, a branch address cache/target CAM (BAC/TgtCAM), a branch history cache (BHC), and a branch target cache (BTC) with an associated target instruction valid (TIV) memory. Each of these arrays contains a row of circuitry directly corresponding to each BPC entry.

Other components perform simple index storage and selection and/or logic functions to generate some of the control signals and storage array word select lines.

The BPC is configured to be accessed several different ways, with each access path intended for a different purpose. The paths differ from each other in regard to the arrays accessed, the type of access (read or write), and the manner of access (associative or via index using one of the internal components). The paths can be utilized to perform several simultaneous, independent "operations" on the BPC. Most of the access paths access the contents of only one BPC entry at a time.

Each access path affects a particular subset of all the components within the BPC. Depending on the particular input signals to the BPC, the PcCAM array or index selection logic is used to generate decoded select signals. In some cases, set, reset, or write signals are also generated for Vbit or TIV bits within each entry.

The PcCAM array stores the address of the branch instructions. Upon detecting a match with an instruction being fetched, the predicted target address of the branch is selected via a match line output from the entry in the PcCAM to an entry in the branch address cache (BAC), also called the target address cache (TAC). This thus provides one access path for the BAC which can be used for predicting the branch target or can be used during a write to a particular line of the branch prediction cache. The BAC also has a fully associative access path allowing addresses to be compared directly to all of the entries. This path is useful for detecting an attempt to write to an address stored in the BAC.

The unique structure of the BPC allows it to be laid out in an efficient manner. Each portion is laid out in array format, with 36 lines across. Each line for each portion is lined up with its corresponding entry in each of the other portions of the BPC. The data inputs are provided from the sides while the read and write selects extend vertically, originating from either the PcCAM or from the index selection logic. For a read or write select from the index selection logic, it is first loaded with the appropriate select data from the horizontal data input, and then enabled to provide the vertical select signals. Multiple select codes can be provided ahead of time into the index selection logic.

The integration of all the access paths permits managing the BPC in a high-performance manner, (i.e. without contention between different operations needing to be performed), together and within the BPC proper. Having the various storage and valid bit array lines that make up each BPC line physically together instead of segregated into separate arrays, minimizes hardware circuitry costs.

It is possible to avoid duplication of circuitry, particularly for generating storage array word selects and valid bit control signals, and to efficiently generate all the necessary sets of select and control signals. Since the signals for each BPC line effectively are generated locally to the corresponding storage and valid bit array lines, all these signals can be efficiently distributed to where they are needed.

The integration of all BPC access paths, and the resultant sharing of circuitry that is possible, allow reduced design complexity of a full (i.e. target address/branch direction/target instructions) BPC. As noted above, each access path requires access and manipulation of several storage/valid bit arrays, and collectively a multitude of accesses and actions need to be supported. The ability to generate select signals within each BPC line, which can directly effect the necessary group of accesses and actions for each access path, allows a relatively straightforward design for both internal and external BPC control circuitry.

A further understanding of the nature and advantages of the present invention may be realized by reference to the remaining portions of the specification and the drawings.

BRIEF DESCRIPTION OF THE DRAWINGS

FIG. 1 is a diagram showing the contents of the branch prediction cache of the present invention;

FIG. 2 is a block diagram of the branch prediction cache according to the present invention;

FIG. 3 is a diagram of the layout of the BPC;

FIG. 4 is a block diagram of the tag RAM of FIG. 2;

FIG. 5 is a diagram of the target address RAM of FIG. 2;

FIG. 6 is a block diagram of the branch target instruction sequence RAM of FIG. 2;

FIG. 7 is a block diagram of the target instruction valid and branch history memory of FIG. 2;

FIG. 8 is a diagram of the address selection logic of FIG. 2.

DESCRIPTION OF THE PREFERRED EMBODIMENT

The branch prediction cache is illustrated in FIG. 1. To understand FIG. 1, it is best to review what a branch instruction is. The instruction causing the change in control flow is called the "branch instruction", and the address of this instruction is called the branch instruction address. The branch instruction may include within it the address of the instruction to be branched to, which is called the branch target instruction. The address of the branch target instruction is the "target address". Alternately, a formula for calculating the target address may be included in the branch instruction. In addition, the branch instruction may be a conditional branch. A conditional branch causes a jump to a branch target instruction only if a test set forth in the branch instruction is met. If the condition is not met, then the branch is not taken and sequential execution continues.

Returning to FIG. 1, the branch prediction cache contains a number of columns. A first column 74 contains a tag which identifies the cache contents for a particular line. That tag is the branch instruction address itself. A separate column 76 contains a valid bit for each entry, indicating if the entry is valid. Another column 78 contains the target address pointed to by the branch instruction whose address is given in column 74. At least the first byte of the actual branch target instruction itself (possibly the entire instruction), possibly along with sequentially occurring instructions after the branch target instruction, up to 24 bytes total, is set forth in a column 80. Thus, the first useful instruction in the 24 bytes is located at the address pointed to by the target address of column 78. A column 82 contains valid bits for each of the instruction word blocks in column 80. Finally, a branch history column 84 contains two bits indicating the direction of the branch during the past executions of that branch instruction. For example, the possible arrangement of the two bits in column 4 could be as follows where the two choices of the conditional branch are A and B:

| Bit Pattern | Branch History |
| --- | --- |
| 00 | AA |
| 01 | AB |
| 10 | BA |
| 11 | BB |

Details of BPC

FIGS. 2-8 show the BPC in more detail. FIG. 2 is a block diagram showing the various elements in BPC 152. The BPC comprises entries containing a relatively large amount of prediction information. In the preferred embodiment, this cache structure contains a full scope of information to enable single branch execution, including: the branch direction if the branch is conditional, the branch target address and cached target instruction data. More specifically, each cache line contains the target address from when the branch instruction was last executed; up to the first 24 bytes of sequential instruction stream starting at the target address; and two history bits recording the direction taken during past executions of the branch instruction.

To this end, BPC 152 includes the branch address tag memory, called a program counter content addressable memory (PcCAM) 170 with associated valid bit (Vbit) memory 172. The target address memory is a branch address cache/target CAM (BAC/TgtCAM) 175. The history of past branch directions is in a branch history cache (BHC) 177. A branch target cache (BTC) 180 contains the target instruction data, with an associated target instruction valid (TIV) memory 182 storing valid bits for the instruction data in BTC 180. Each of the memory arrays contains 36 lines and is directly accessed via word select inputs (as opposed to encoded word address inputs). Some of these sets of word selects for reading and writing each line are generated by address selection logic 185 with associated multiplexer 188. Other word selects are generated by the match outputs of PcCAM 170. A Least Recently Used (LRU) logic block 181 has logic which performs the function of selecting a BPC line to be overwritten by a new block of instruction data.

Given the relatively limited size of this cache, it is designed to support accesses in a highly associative manner versus a direct-mapped or two/four-way set associative manner. This look-up, to check whether an entry currently exists in the cache for a branch about to be processed, is typically performed using the address of the branch instruction. For some pipeline designs, a closely related address may instead need to be used.

In this context, the term fully associative means that bits of the input address are compared with potentially matching bits of all the entries in cache. A hit is defined to have occurred when the input address matches at least one stored address. The term direct mapped means that some number of bits of the input address are used to index into the memory, and the remaining bits are stored in the memory. When the entry is read out of the memory, the stored address bits are compared with the corresponding bits in the input address and a hit is defined to have occurred when the two agree. This entails a single comparison. In the event that two branch instructions index to the same entry (different PC's with the same set of index bits), a direct mapped cache can only accommodate one, even if there are other empty entries. The term two-way set associative refers to a structure with two memory banks, so that two entries are read out for a given index and two comparisons are performed. This concept can be expanded to more than two-way set associative.

In the preferred embodiment the address of the first byte of the next instruction to be decoded is used for the look-up in the BPC, and is done in parallel with instruction fetch completion and start of instruction decode. This look-up is also done in a fully associative manner which provides substantial performance improvement relative to direct-mapped or two/four-way set-associative access methods.

A cache tag for each entry, namely the instruction address of the branch associated with the entry, is stored in PcCAM 170. A cache look-up is performed by accessing PcCAM 170 using the above next instruction address, and then reading out the prediction information from any, but at most one, entry for which there was a tag match.

This greater associativity is with respect to both cache look-ups and cache replacements, i.e. when adding each entry to the cache a new entry to the cache requires that some other (hopefully less beneficial) entry be removed to make room. Through the greater flexibility in choosing "old" entries to be replaced by new entries, it is statistically possible to better approximate the ideal of retaining prediction information for the branches deemed most likely to be processed again in the near future and the most often. In essence, full associativity maximizes the prediction cache's hit rate for a given cache size (in number of entries).

An instruction buffer 153 (not shown) is used for temporarily holding instruction bytes before they are aligned and provided to the instruction register.

FIG. 3 is a diagram of the layout of the BPC according to the present invention. BTC 180 is shown at the top of the block which is a horizontal row of circuitry for each of the 36 entries. Immediately below it is PcCAM 170 with its 36 entries aligned with the 36 entries of the BTC. Similarly aligned are the valid bit memory 172, the address selection logic 185 which performs a line selection function (LSF), the LRU 181, BHC and TIV 12, and the target address cache (TAC) 175 (also called BAC/TgtCAM).

The select signals for a single entry 14, as delineated by a dotted line, is illustrated. The signals shown are duplicated for each of the 36 entries in each of the elements of the BPC. Data and address inputs and outputs are provided from the left hand side horizontally into each element, such as BTC 180. Select lines for reads and writes originate from either PcCAM 170 or LSF 185. A match line output 16 of PcCAM 170 is used as a read select to BHC and TIV 12, and, through multiplexer 18, as a read select to BTC 180 and TAC 175. Multiplexer 18 allows a similar read select signal to be generated from the address selection logic 185 along a select line 20. In addition, PcCAM 170 and TAC 175 are fully associative, and can be read by providing an address on address inputs 22 and 24, respectively.

Address selection logic 185 also provides a number of different write select paths. A write select 26 allows a write to PcCAM 170. A separate write select 28 will write to valid bit memory 172 and BHC and TIV 12 at the same time. A write select 30 is used for TAC 175 and a write select 32 is used for BTC 180.

Data can be loaded into the various elements on data buses which extend horizontally. The particular entry or line of the cache into which it is to be entered is chosen by the write select lines. A data bus 34 provides data I/0 in to BTC 180. A data bus 36 provides address input to PcCAM 170. There is no address output, although there is a match output on line 38. A single bit data input 40 is provided to valid bit memory 172. Again, there is no data output, but the data is provided directly from the corresponding entry in valid bit memory 172 to PcCAM 170 on a line 42. A valid bit is necessary to enable the output on the match line 16.

A data input bus 44 is provided for address selection logic 185. Again, there is no data output, with the outputs being the particular write and read selects provided to the various other elements of that line of the branch prediction cache. A data input 46 is provided to LRU 181 and a data I/0 is provided to BHC and TIV 12 on a bus 48. Finally, an input/output data bus 50 is coupled to TAC 175.

The circuitry will now be described with additional reference to a series of logic schematics. Each logic schematic for one of the memories shows the circuitry for one line in that memory. Since there are 36 lines, in BPC 152, the circuitry shown for a given memory is repeated 36 times for that memory.

FIG. 4 is a logic schematic of PcCAM 170 and associated Vbit memory 172. PcCAM 170 is a RAM/CAM array holding the instruction address of the branch for which each cache entry is storing prediction information. Each line in PcCAM 170 includes a 32-bit RAM word 190 and a CAM comparator 192. Each line in Vbit memory 172 holds a valid bit indicating the overall validity of the line, and is implemented as a latch 195. The CAM address input may be the address of the first byte of the next instruction to be decoded, and is compared with the contents of RAM word 190. In the event of equality, the CamMatch2 line for that entry is asserted, as qualified by a true output from Vbit latch 195.

The nature of PcCAM 170 supports fully associative BPC lookups and replacements. The CamMatch2 signal from each line is output for use by the other BPC components, while the RAM aspect of the array applies only to writing instruction addresses into the PcCAM.

FIG. 5 is a logic schematic of BAC/TgtCAM 175. The BAC/TgtCAM is a mixed RAM/CAM array holding the target address from the most recent execution. Each line includes a 39-bit RAM word 200, a 16-bit CAM comparator 207, a 4-bit CAM comparator 202, a pair of 7-bit CAM comparators 203 and 205, and associated logic. Of the 39 bits, 32 bits are the target address of the branch. The other 7 bits are additional target address information, as will be described below. The full 32-bit target address is made available for readout if the particular BAC/TgtCAM line is selected, as determined by CamMatch2 from PcCAM 170 via mux 188.

The CAM segments of BAC/TgtCAM are used to detect memory stores by instructions currently being processed within the CPU pipeline or external writes or replacements. Since these instructions possibly modify target instruction bytes, it is necessary to invalidate the BPC entry in order to maintain proper coherency between target instruction bytes in the BTC and their image in main memory (actually in the ICache).

ICache RAM chip 30 contains 64 kilobytes, organized as 32-byte lines, and is thus characterized by an 11-bit address (the five low order bits may be ignored). The ITAG RAM contains the high order 16 bits. The 27-bit address ChkAddr of a line being written in the ICache is communicated to the CamAddr1 input of the BAC/TgtCAM. However, the BTC entry could straddle a line boundary, and so may be characterized by two line addresses. Thus, two target addresses (which may be the same) need to be stored and checked. In fact, the high order 16 bits need not be checked for an external write, because the BPC is constrained to have only entries which are in the I cache for external writes. All variations of the upper 16 bits of instruction addresses which have the same 11 bits below must share the same I cache line so only 11 bits of each address need to be checked. Two 11 bit addresses in the BPC are checked, covering the possibly two lines which could be spanned by a 24 byte BTC entry. By requiring that the two lines be in the same 4-kilobyte page (i.e., that the BTC entry not straddle a page boundary), the 4 most significant bits of the second 11 bit address will be the same as for the first 11 bit address, and can be ignored. To save space, the 7 bits of the second address are added to the same physical RAM word containing the 32 bit BAC address. CAM comparators 203 and 205 compare the two 7-bit fields of the RAM line with the corresponding 7 bits of ChkAddr on the CAM Addr 1 input while CAM comparator 202 compares the 4-bit field in the RAM line with the corresponding 4 bits of ChkAddr.

A match is defined to have occurred on a particular line if the 4 bits of the 27-bit ChkAddr match the 4 bits of the RAM line (as detected by comparator 202), the 7 bits of the ChkAddr match either 7-bit field of the RAM line (as detected by comparators 203 and 205) and the external write line is enabled or (for internal writes) the 16 bit field of ChkAddr matches the 16 bit field of the RAM line (as detected by comparator 207). If a match occurs (more than one can occur since more than one BTC entry can be affected by a write in a given line), the corresponding BPC entries are invalidated.

The 32 bit branch target address can be read out through driver 204 on data bus rdBACData.

FIG. 6 is a logic schematic of BTC 180. Each BTC slice comprises a 192-bit RAM word, implemented as three 64-bit RAM words (8 bytes) 220a, 220b, and 220c. Depending on the instruction length and alignment, the BTC possibly holds the first few instructions at the target address of the branch (in this case, up to the first 24 bytes of aligned target instruction data). In the context of the preferred embodiment, in which a CISC architecture possessing variable byte length instructions is implemented, the BTC cache caches the target instruction stream image as found in main memory. As an alternative, the first one or several target instructions could be cached in an alternate, possibly decoded, representation that may be more suitable for other CPU implementations.

Each 64 bit output is provided through drivers 218a, 218b and 218c, with each RAM word output forming a 64 bit portion of 192 bit rdData output bus. The read select signal for a particular one of the 36 lines is provided through an AND gate 216. The write select signals are provided through a series of AND gates 214, 212 and 210.

FIG. 7 is a logic schematic of TIV 182 and BHC 177. Each line of TIV 182 includes latches 225a, 225b, and 225c, each holding a valid bit corresponding to eight of the 24 instruction bytes within the BTC line. Each line of BHC 177 is a 2 bit RAM 127.

FIG. 8 is a logic schematic of address select circuitry 185. Four pairs of latches designated IL1, FL1 through IL4, FL4 are provided. The first latch (IL) in each pair stores a pointer to an entry in the branch prediction cache. Four sets are provided to track multiple branches. The second latch (FL) in each pair is provided to point to a pre-fetch instruction queue which may be associated with each branch.

One input to each of the IL latches is provided through multiplexers 240, 242, 244 and 246 from the PcCAM match line 248. Inputs to the FL latches are provided through a 36 bit input bus 252. The outputs of both the IL and the FL latches are provided to a multiplexing network 256.

The circuit of FIG. 8 provides a flexible approach to producing a number of control signal outputs from the multiplexing network 256, as discussed below. For example, a PcCAM match will provide a 1 bit on one of the 36 bit lines, with all the rest being zero. This could be written into IL latch 1, for instance, so that a single bit in latch IL1 is enabled. The output could then be provided to multiplexing network 256 to activate the appropriate control lines for that entry.

Integrated BPC Data Paths

In the context of a highly pipelined architecture, it is desirable to be able to perform several operations on the BPC at one time. For example, typical operations would be accessing the BPC on every cycle. It might be desired to store target bytes in the BTC, to invalidate an entry, or to update the history bits. As will be described in detail below, address select logic 185, PcCAM 170, and BAC/TgtCAM 175 provide various select and enable signals to control reading, writing, setting and clearing of addresses, instructions, and valid bits. The integrated BPC structure allows any number of these operations to be performed in the same cycle for different entries without contention of competing elements.

1. Read an Entire BPC Entry on a PcCAM Match

A first access path, used to access the BPC entry, is invoked by communicating a 32-bit DecodePC signal to the CamAddr2 input of PcCAM 170. If a match occurs, a single bit of the 36-bit CamMatch2 output 248 is asserted, and is communicated to read select inputs on the other memory elements, namely BAC 175, BHC 177, BTC 180, and TIV 182 via mux 188. The result is that the corresponding entries, constituting the entire BPC entry, are read out of respective data outputs of the memory elements.

2. Write to PcCAM

A second access path, used to clear an old entry and start a new entry, is invoked by writing a 36 bit word, with all 0's except for a single bit, which has a 1, into one of the latches of FIG. 8 through input 248 and multiplexers 240, 242, 244, and 246. The desired 32-bit address to be stored is provided to the WrData input of PcCAM 170 (see FIG. 2). The output 258 of multiplexer network 256 is selected to assert signals at the WrSel2 input of PcCAM 170, and the Clearza input of Vbit memory 172. This enables writing a new entry into the PcCAM, and clears the valid bit, pending acquisition of the target bytes. The same latch is used as a pointer for the BTC write, BAC write and BHC, V and TIV writes for that entry.

One latch pair in address select logic 185 is a working latch pair which is not being used to track a particular branch at that time. The use of four sets of latches allows three instruction streams to be kept active (the original stream and two branches), while the fourth pair of latches is used for working purposes such as writing to PcCAM. The output of each FL latch, which is written to through address input 252, is also coupled back through the multiplexers 240–246 so that it can be written into the IL latch as desired.

In practice, the FL is loaded for access (2), a write to PcCAM. It remains unchanged throughout (3)–(6) style accesses below if there is a hit. If there is a miss and an entry is created, then the FL is reloaded to point to a new queue. Accesses (3)–(6) may then occur.

Similarly, IL is loaded when there is a hit with the PcCAM output. It is then used for accesses (3)–(6).

3. Write to BTC

A third access path is used to fill in the BTC. The line is pointed to by the latch pointing to the PcCAM portion of the line. Three 8-byte select signals are provided to the WrEnx2 input of BTC 180. A single 8 byte block to be stored for the selected entry is provided to the WrData inputs on BTC 180. This allows part of a BTC entry to be written as multiplexer network 256 output 260 asserts select signals at inputs to the WrSel2 input of BTC 180.

4. Write to BAC

A fourth access path is used to write 39 bits of target address to the WrData inputs of BAC/TgtCAM 175 when the target address is available.

5. Write to BHC, V and TIV

For a fifth access path, a valid data bit is provided to the WrData input of Vbit memory 172, 3 bits are provided to TIV 182 and 2 bits of history information are provided to the WrData inputs of BHC 177. This allows completion of the BPC entry as output 262 of multiplexer network 256 is selected.

6. Read BTC and BAC

A sixth data path is invoked by referencing one of the IL or FL latches as output 264 of multiplexing network 256. A select signal is also provided to multiplexer 188. This allows a given BTC and BAC line to be read out independently of any CAM hit from PcCAM 170. The entire BTC entry can be read, or one or more of the three double-words in the BTC entry can be read. This provides flexibility that allows certain otherwise unused BTC entries to be used for other purposes (such as instruction queues) and be controlled independently.

7. Consistency Check of BAC

A seventh access path is invoked by communicating ICache address information to the CAMAddr input of BAC/TgtCAM 175 for an external write to the I cache.

As mentioned above, the CAM portion of BAC/Tgt-CAM 175 performs the function of maintaining consistency between the target instruction bytes in BTC 180 and corresponding bytes in main memory (actually in the instruction cache). A match causes assertion of the appropriate CamMatch1 output line 266, and clears the corresponding Vbit entry.

8. Invalidate All 36 BPC Entries

An eighth access path is invoked by asserting a signal at the ClearA112 input 268 of Vbit 172. This can be carried out in a manner independent of other ongoing operations, and in some sense supercedes them all, because it invalidates all the BPC entries.

What is claimed is:

1. An integrated branch prediction cache structure comprising:
   a program counter content addressable memory (PcCAM) for storing branch instruction addresses;
   a valid bit (Vbit) memory associated with said PcCAM;
   a branch address cache (BAC) for storing branch target instruction addresses;
   a branch history cache (BHC) for storing data indicating the direction of past branches;
   a branch target cache (BTC) for storing instruction data at said branch target instruction addresses;
   a target instruction valid (TIV) memory associated with said BTC;
   each of said PcCAM, Vbit memory, BAC, BHC, BTC, and TIV memory containing N entries;
   each of said BAC, BHC, BTC, and TIV memory having N read select inputs, corresponding to its N entries, the appearance of an active signal at one of which allows the corresponding entry to be read;
   said PcCAM having associated means, responsive to an address input, for determining whether any entry corresponds to input, and for asserting a read select signal corresponding to any match of a specific PcCAM entry that corresponds to the address input;
   means for applying said read select signal to the read select input of each of said BAC, BHC, BTC, and TIV memory entries that correspond to the specific PcCAM entry to allow such corresponding entries to be read.

2. The integrated structure of claim 1 further comprising means for performing a content addressable match of said BAC.

3. The integrated structure of claim 1 further comprising address selection logic having, for each of said N entries, write enable outputs to said PcCAM, BAC, BTC, BHC and TIV memory and an input bus coupled to said address selection logic for all of said N 4. The integrated cache structure of claim 1 said PcCAM is a content addressable memory (CAM) having N memory words for storing said N PCC entries; and
   said associated means for determining comprises
   N comparators, each associated with a respective one of said N memory words, each comparator having a first input responsive to the PC input, a second input responsive to the content of its associated memory word, and an output on which is asserted said read select signal when the values at said first and second inputs agree.

5. The integrated cache structure of claim 1 wherein each of said PcCAM, Vbit memory, BAC, BHC, BTC, and TIV memory has N write select inputs corresponding to its N entries, and further comprising:
   a plurality of address selection logic means, each responsive to a respective index input representing a desired entry number, for asserting a write select signal corresponding to the desired entry number; and
   means for applying each of said plurality of write select inputs to a selected subset of said read select inputs and write select inputs.

6. The integrated cache structure of claim 1 wherein said BAC comprises:
   N memory words for storing N BAC entries, each BAC entry containing target address information including at least a portion of at least one target address associated with the corresponding BTC entry;
   means for receiving a check address input;
   N comparator means, each associated with a respective one of said N memory words, for comparing at least a portion of said check address input with said target address information stored in its associated memory word; and
   N means, each associated with one of said N entries, operative in response to an output of one of said N comparator means, for setting the corresponding entry in said Vbit memory to signify invalid.

* * * * *